Figure 1:
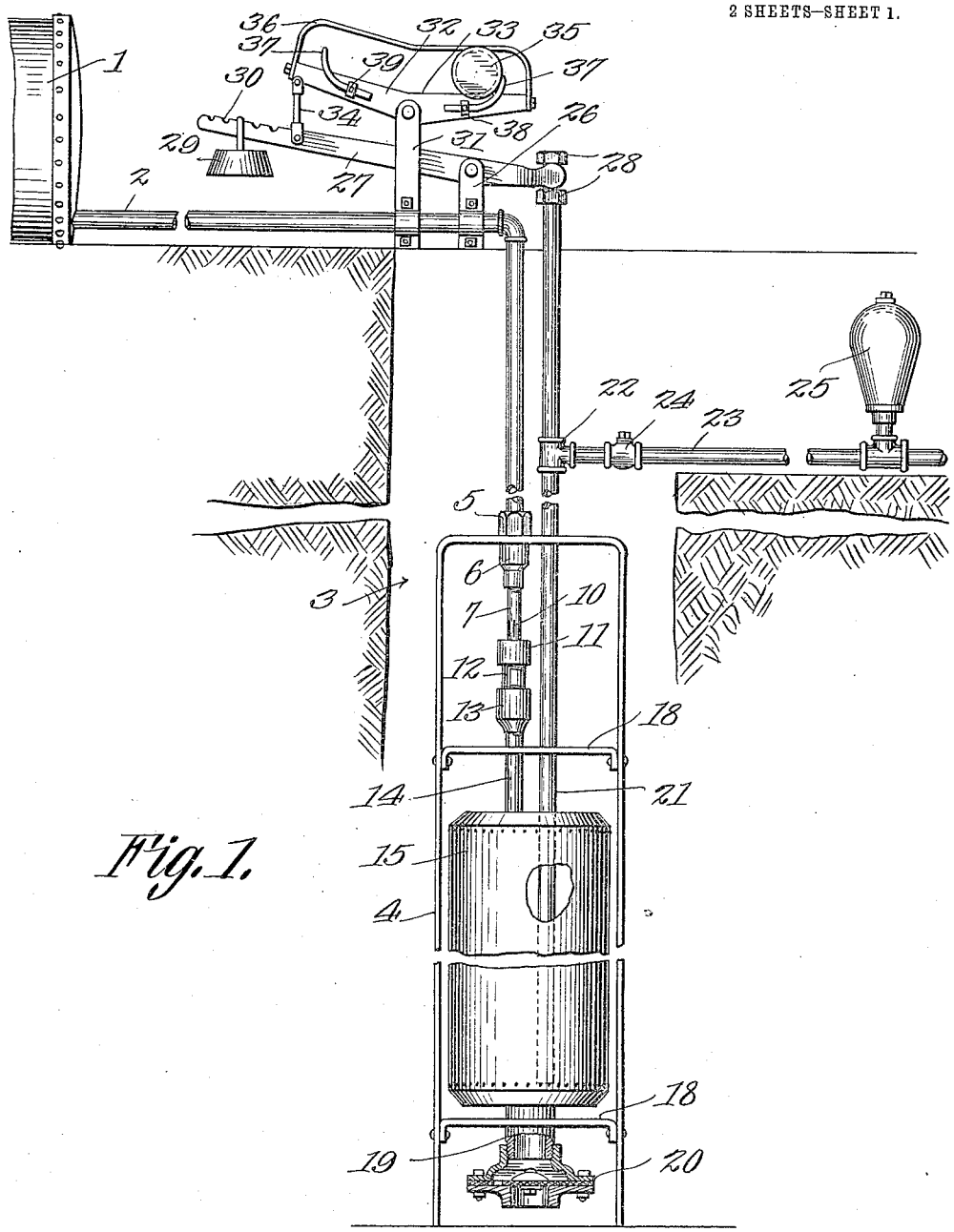

M. J. HEWLETT.
WATER SUPPLY APPARATUS.
APPLICATION FILED JUNE 5, 1913.

1,125,319.

Patented Jan. 19, 1915.
2 SHEETS—SHEET 1.

WITNESSES
F. B. Wooden.
F. T. Chapman.

INVENTOR
M. J. Hewlett
BY
ATTORNEY

M. J. HEWLETT.
WATER SUPPLY APPARATUS.
APPLICATION FILED JUNE 5, 1913.
1,125,319.
Patented Jan. 19, 1915.
2 SHEETS—SHEET 2.
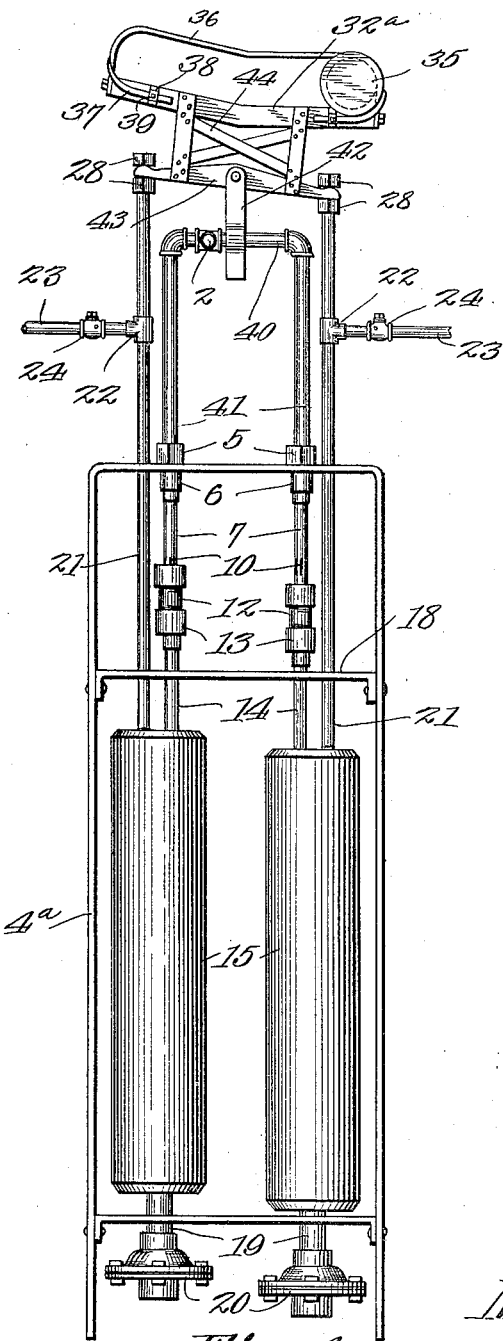
Fig. 4.
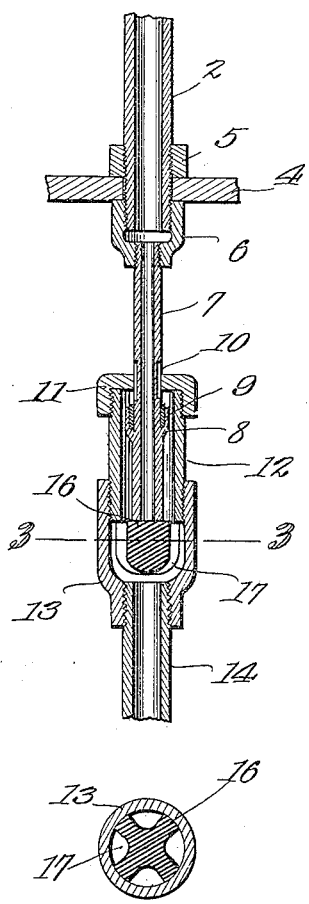
Fig. 2.
Fig. 3.
WITNESSES
A. B. Wooden.
F. T. Chapman.
M. J. Hewlett
INVENTOR
BY
E. G. Siggers
ATTORNEY.

UNITED STATES PATENT OFFICE.

MADDRA J. HEWLETT, OF KEWANEE, ILLINOIS.

WATER-SUPPLY APPARATUS.

1,125,319. Specification of Letters Patent. Patented Jan. 19, 1915.

Application filed June 5, 1913. Serial No. 771,908.

*To all whom it may concern:*

Be it known that I, MADDRA J. HEWLETT, a citizen of the United States, residing at Kewanee, in the county of Henry and State of Illinois, have invented a new and useful Water-Supply Apparatus, of which the following is a specification.

This invention relates to improvements in water supply apparatus, and its object is to provide a simple and efficient means for providing a water supply under the requisite pressure and without material waste.

In accordance with the present invention there is provided a float chamber into and out of which water may flow when the float chamber is immersed in a supply of water, and this water chamber is equipped with counterweight and valve structures so arranged that when a supply of fluid under pressure is coupled up with the float chamber, such fluid under pressure will flow into the float chamber when the latter is full of water and will be cut off when emptied of water, so that under the last named conditions water may again flow into and fill the float chamber to reëstablish the first-named conditions, wherefore the operation of the device is automatic and the water elevated may either flow freely from the discharge pipe, or may be drawn therefrom as needed, as when the structure is attached to a dwelling or other buiding provided with the usual water distribution system.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications mark no material departure from the salient features of the invention.

In the drawings: Figure 1 is an elevation with some parts in section and other parts broken away, showing the improved water supply system, the showing being in part diagrammatic or schematic. Fig. 2 is a longitudinal section of a cut-off valve employed in the system. Fig. 3 is a section on the line 3—3 of Fig. 2. Fig. 4 is a view similar to Fig. 1 but less extensive and showing a duplex apparatus for the same purpose.

Referring to the drawings, there is shown in Fig. 1 a tank 1 which is assumed to contain a supply of air or gas under pressure, which supply may be maintained in any suitable manner requiring no special description. Moreover, the tank 1 may be considered as indicative of any means whereby there is provided a supply of fluid under pressure. Leading from the tank 1 there is a pipe 2 which may be conducted into a well 3 or other source of water supply, and this pipe terminates at a frame 4 presumed to be in the well 3 or other water container and in part below the surface of the water. The pipe 2 is provided on one side of the frame 4 with a lock nut 5 and on the other side with a reducing coupling 6, which parts are best shown in Fig. 2. The reducing coupling 6 receives a pipe 7, which at an intermediate point carries a cup 8 in which is lodged a packing ring 9, preferably of rubber, although not confined to such substance. Adjacent the ring 9 on the side thereof toward the reducer 6 the pipe 7 is provided with longitudinal grooves 10 which may be arranged about the pipe 5 in circular series on the outer face thereof. The pipe 7 extends through a cap 11 applied to one end of a nipple 12, the other end of which is screwed into a reducing coupling 13, the nipple 12 being of considerably greater diameter than the pipe 7 and from the reducing coupling 13 there extends a pipe 14 to the upper end of a float 15 which may be in the form of an elongated tank of cylindrical cross-section, although any particular shape is not obligatory. The pipe 14 opens freely into the float 15. Seated in the reducer 13 between the nipple 12 and the smaller end of the reducer is a block 16, preferably, though not necessarily, of rubber, and this block is formed with marginal channels 17 which may be longitudinal thereof, and which coalesce at one end, that end being the end toward the pipe 14, so that the channels are open to the pipe 14. The central part of the block 16 remote from the pipe 14 is of sufficient area to present a solid face toward the corresponding end of the pipe 7, thereby constituting the block 16 a valve seat for the pipe 7. The construction is such that the cap 11 and parts connected thereto may slide on the pipe 7 and in one position the ring 9 engages the inner face of the cap 11, thereby forming a seal about the pipe 7, while in another position of the parts the grooves 10 are brought into traversing relation to the cap 11, and the end of the pipe 7 remote from the coupling 6 is brought into sealing relation with the seat or block 16.

The frame 4 is provided with cross braces 18 through one of which the pipe 14 may pass and fit loosely enough to slide therethrough, while the tank or float 15 has at the lower end, the tank being installed in the upright position, a nipple 19 carrying a foot valve 20, which latter may be of ordinary construction. Entering the upper end of the float 15 is a pipe 21 made fast to the float, so as to move therewith, and this pipe has sliding and guiding connections in the frame 4 and an appropriate one of the braces 18, and is carried to a high point, say, above the surface of the ground when the float 15 is installed in a well or cistern or other underground container of water. At any appropriate point in the pipe 21 there is provided a T coupling 22 from which branches a pipe 23 which may lead to the point of utilization of the water, such as a dwelling house or other building, or a reservoir into which the water is to be discharged. It is advisable to include a check valve 24 in the pipe 23 with the valve closing toward the pipe 21, and also to include in the pipe 23 an air bell 25, which in a single acting system, such as illustrated in Fig. 1, will contribute toward a steady flow of water.

At some high point, say, the surface of the ground, there is provided a support or post 26 constituting a fulcrum or pivot support for a lever 27, the shorter end of which may straddle the upper end of the pipe 21 between nuts 28 thereon, or this lever may be connected to the pipe in any other manner, so that a rise and fall of the float 15 and pipe 21 with it will cause a rocking of the lever 27, provision being made for permitting a corresponding motion of the pipe 23 where joining the pipe 21. In the case of a rather long length of pipe 23 the elasticity of the pipe will permit this motion, but in the case of short pipes any suitable means may be employed to permit the rise and fall of the end of the pipe 23 where connected to the pipe 21. That end of the lever 27 connected to the pipe 21 may be the shorter end of the lever, and the other end of the lever, which may be considered as the longer end of the lever, is provided with a counterweight 29, which by means of notches 30 or other provision on the lever 27, may be adjustable lengthwise thereof to properly counterbalance the float 15.

Adjacent to the post or support 26 is another post or support 31 on which is pivotally mounted a rock arm 32, the pivot being about midway of the length of the arm. The upper surface of this arm inclines from the middle or pivoted portion of the arm toward the ends. Near one end the rock arm is connected to the longer arm of the lever 27 by a link 34. Mounted on the doubly inclined upper edge of the arm 32 is a roller 35 which may be a flanged roller, so as to maintain its position upon the arm, while a guard in the form of a rod 36 is carried by the arm in a manner to also engage the roller 35 and hold it to said arm, but permitting the roller to move from one end of the arm toward the other. This movement may be coextensive with the length of the arm or may be limited to any desired extent by stop fingers 37 held to the arm by straps 38 or otherwise, and held in adjusted positions by set screws 39, or in any other suitable manner. The posts 26 and 31 may be conveniently employed to in part support the pipe 2, as indicated in Fig. 1.

The structure of Fig. 4 differs from that of Fig. 1 in that it is a duplex structure having two floats 15 mounted in a single frame 4$^a$ of sufficient size, but otherwise agreeing in structure with the frame 4 of Fig. 1. Other parts of the structure are duplicates throughout the duplex device of Fig. 4, and wherever parts such as already described occur in Fig. 4, the same reference numerals are employed. There being two floats 15, the pipe 2 does not lead directly to the frame 4, but is provided with branches 40 connected by separate pipes 41 to corresponding couplings 6 and so into the respective floats 15, this being in effect a doubling of the structure of Fig. 1.

On a suitable post or support 42 there is pivoted a rock arm 43 which may take the place of the lever 27, and the upper ends of the pipes 21 coming from the two floats 15 are connected to the respective ends of the rock arm 43 by spaced nuts 28, or in any other suitable manner. Fast to and rising from the arm 43 is a frame 44 carrying a rock arm 32$^a$ on which is mounted a roller 35 and guard 36, as in Fig. 1. In the structure of Fig. 4 the counterbalance weight 29 is unnecessary since the same result is brought about by the employment of two floats 15.

Let it be assumed that the structure is installed, so that the float 15 is immersed in a suitable body of water, but as yet no air or gas or other pressure is provided in the reservoir or supply tank 1. Under these circumstances the float 15 being full of air will naturally rise until further upward movement is arrested by engagement of the lower end of the pipe 7 with the seat 16. This, however, brings the grooves 10 in traversing relation to the cap 11, so that there is communication between the interior of the nipple 12 and the atmosphere above the cap 11 by way of the grooves 10, the ring 9 at this time being in spaced relation to the inner wall of the cap 11. There is, therefore, free air communication from the interior of the float at the upper end thereof through the pipe 14 by way of the channels or grooves 17 to the interior of the nipple 12, and to the atmosphere through the grooves 10. Since the float 15 is immersed in water, the latter will flow through the foot valve 20 into the interior of the float and fill the latter, it being assumed that the water level is above the top of the float 15, but if such be not the case, then the float is filled to the level of water within the body of water into which the float is sunk. The weight 29 as applied to the lever 27 is so related to the float 15 that it will overbalance the float while the latter is empty and buoyed up by the surrounding water. Furthermore, the roller 35, which is also active as a weight, is at the end of the arm 32 corresponding to the weighted end of the lever 27, wherefore the parts are in the reverse position to that shown in Fig. 1, but agreeable to the left hand side of Fig. 4.

Water flows into the float 15 as stated until the latter is filled, whereupon the weight of water, together with the weight of the float is sufficient to overbalance the weights 29 and 35, wherefore the float sinks, and this sinking motion is participated in by the pipe 21, thus rocking the lever 27 until its longer end is lifted and the arm 32 is likewise rocked, resulting in the movement of the weight 35 toward the other end of the arm 32, and, therefore, contributing its weight to that of the filled float and tending to hold the float in the depressed or lowered position. The lowering of the float causes a movement of the pipe 14, reducer 13, nipple 12 and cap 11 downwardly until its movement is arrested by the engagement of the ring 9 with the inner face of the cap, and the movement of the grooves 10 toward the exterior of the cap, although any passage of air through these grooves is then prevented by the sealing action of the ring 9 against the inner face of the cap 11. At the same time the seat block 16 is lowered away from the lower end of the pipe 7, thus opening said pipe into free communication with the interior of the nipple 12. If, now, it be assumed that there is air or other fluid pressure within the tank or reservoir 1, such fluid will flow through the pipe 2 into the pipe 7 and from the lower end of the latter into the nipple 12, finding its way freely through the grooves or passages 17 into the pipe 14, and so into the float 15. The accumulated pressure will cause a closing of the check valve 20 if not already closed, and the water is forced into the pipe 21, which latter terminates close to the bottom of the float 15 within the latter. If, now, the discharge end of the pipe 23 be open, water will be forced from the interior of the float 15 through the pipe 23 past the check valve 24, and if the outflow be interrupted, then a certain amount of water accumulates within the air bell 25 with the air trapped therein under pressure. Ultimately the water within the float 15 becomes exhausted, or nearly so, whereupon the counterweight 19 is then sufficient to overbalance the nearly emptied float 15 as aided by the buoyancy of the nearly empty float. This causes the float to rise in a manner already described, and the counterweight 35 will roll to the other end of the arm 32, thus serving as a sort of temporary anchor maintaining the float in the elevated position until it becomes once more filled with water and again sinks. As soon as the float rises, communication with the air tank 1 is cut off by the engagement of the rubber seat 16 with the lower end of the pipe 7. In this manner there is provided a continual supply of water under suitable pressure to lift it to the desired height, and while the float 15 is rising and filling, which it may do rapidly, the water within the air bell 25 under such pressure as has been established therein, will provide a supply of water for all ordinary uses until the float is again filled.

In the structure shown in Fig. 4 two floats provide a means for a constant supply of water, even though the latter be used in comparatively large quantities and the air bell 25 is unnecessary. In other respects the action of the structure of Fig. 4 is similar to that of Fig. 1.

The adjustable weight 29, as well as the adjustable fingers 37, provide means whereby various conditions may be readily provided for by a single apparatus, thus materially cheapening the cost of production of the structure, since it is unnecessary to build a distinct and separate plant for each installation, because the same structure may be employed in all installations requiring but the adjustments for which provision is made.

What is claimed is:—

1. In a water supply system, a float having means for the entrance of water thereinto and an outlet pipe for water entering the float, means for supplying compressed air to the float to cause the discharge of water therefrom, said air-supply means including a two-part telescoping valve having one member fixed against movement and the other member connected to the float for movement therewith in opposite directions, and said valve having means for sealing the air pipe at both limits of travel of the movable valve member to thereby prevent leakage of the compressed air to the atmosphere, an intermediately pivoted rock arm connected near one end to the float for participation at all times in the movements of the float, said rock arm having an upper or active surface inclined both ways from the pivot to provide a doubly inclined runway, and a rollable weight mounted on the runway surface of the rock arm.

2. In a water supply system, a float having means for the entrance of water thereinto and an outlet pipe for water entering the float, means for supplying compressed air to the float to cause the discharge of water therefrom, said air-supply means including a two-part telescoping valve having one member fixed against movement and the other member connected to the float for movement therewith in opposite directions, and said valve having means for sealing the air pipe at both limits of travel of the movable valve member to thereby prevent leakage of the compressed air to the atmosphere, an intermediately pivoted rock arm connected near one end to the float for participation at all times in the movements of the float, said rock arm having an upper or active surface inclined both ways from the pivot to provide a doubly inclined runway, and a rollable weight mounted on the runway surface of the rock arm, said rock arm being provided with adjustable limiting means associated with the runway surface thereof to determine the extent of travel of the rollable weight in either direction.

3. In a water supply apparatus, a float provided with a foot valve, a water outflow pipe connected to and movable with the float, means for supplying fluid under pressure to the float and provided with a telescoping valve structure for cutting off the fluid supply means and opening the interior of the float to the atmosphere on the rise of the float, a lever connected to the water outflow pipe to be rocked thereby on the rise and fall of the float, a rock arm connected to the lever and having its upper edge doubly inclined from the pivot point of the rock arm and a rollable weight movable to one side or the other of the pivoted support of the arm in accordance with the rise and fall of the float.

4. In a water supply apparatus, a float provided with a foot valve, a water outflow pipe connected to and movable with the float, means for supplying fluid under pressure to the float and provided with a valve structure for cutting off the fluid supply means and opening the interior of the float to the atmosphere on the rise of the float, a lever connected to the water outflow pipe to be rocked thereby on the rise and fall of the float, and a rock arm connected to the lever and provided with a rolling weight movable to one side or the other of the pivoted support of the arm in accordance with the rise and fall of the float, said rock arm having adjustable fingers in the path of the rolling weight to determine its extent of movement to one side or the other of the pivot support of the arm.

5. In a water supply apparatus, a float provided with a foot valve, a water outflow pipe connected to and movable with the float, means for supplying fluid under pressure to the float and provided with a valve structure for cutting off the fluid supply means and opening the interior of the float to the atmosphere on the rise of the float, a lever connected to the water outflow pipe to be rocked thereby on the rise and fall of the float, and a rock arm connected to the lever and provided with a rolling weight movable to one side or the other of the pivoted support of the arm in accordance with the rise and fall of the float, said rock arm having adjustable fingers in the path of the rolling weight to determine its extent of movement to one side or the other of the pivot support of the arm, the lever to which the pipe for the outflow of water is connected being also provided with a counterbalancing weight.

6. In a water supply apparatus, a float provided with a foot valve, a water outflow pipe connected to and movable with the float, means for supplying fluid under pressure to the float and provided with a valve structure for cutting off the fluid supply means and opening the interior of the float to the atmosphere on the rise of the float, a lever connected to the water outflow pipe to be rocked thereby on the rise and fall of the float, and a rock arm connected to the lever and provided with a rolling weight movable to one side or the other of the pivoted support of the arm in accordance with the rise and fall of the float, said rock arm having adjustable fingers in the path of the rolling weight to determine its extent of movement to one side or the other of the pivot support of the arm, the lever to which the pipe for the outflow of water is connected being also provided with a counterbalancing weight, and the pipe for the outflow of water including a check valve and an air bell.

7. In a water supply apparatus, a float provided with means for the inflow of water, an outflow pipe leading from the float and a pipe for directing fluid under pressure to the float and including a valve structure comprising a relatively fixed pipe having a sealing means thereon, and means for the flow of air along the exterior of the pipe, a chambered member in surrounding relation to the sealing means and traversed by the portion of the pipe containing the means for the flow of air, and a seat for the pipe within the chamber having permanent air passages between the chamber and the float.

8. In a water supply apparatus, a float, means for the inflow and outflow of water therefrom, and a pipe for supplying fluid under pressure to the float including a valve structure comprising a relatively fixed pipe with a sealing member at an intermediate point and exterior grooves adjacent the sealing member, a chambered member entered by the pipe and related thereto to inclose the sealing member and to be moved with relation to the pipe to bring the interior of the chambered member into communication with the atmosphere through the grooves and to seal the chamber against communication with the atmosphere by the sealing member, a coupling for connecting the chambered member with the float, and a seat or block carried by the coupling and provided with peripheral grooves in constant communication with the float, said block being in position to receive the corresponding end of the pipe entering the chambered member to seal said end of the pipe on the rise of the float.

9. In a water supply system, a float having means for the entrance of water thereinto and an outflow for water entering the float, means for supplying compressed air to the float to cause the discharge of water therefrom, a telescoping valve structure provided with sealing abutment portions active at the limits of travel of the movable member of the float in both directions, said movable member being directly connected to the float for participation in the rise and fall thereof, and a rockable counterweight structure connected to the float for participation at all times in the rising and falling movements of the latter, said rockable member being provided with a rollable weight movable to opposite sides of the pivot support of the rockable member, and the latter being provided with a runway for the rollable member inclined in opposite directions from the pivot support of the rockable member.

In testimony, that I claim the foregoing as my own, I have hereto affixed my signature in the presence of two witnesses.

MADDRA J. HEWLETT.

Witnesses:
OSCAR D. PETERSON,
WM. L. BUCKINGHAM.

Copies of this patent may be obtained for five cents each, by addressing the "Commissioner of Patents, Washington, D. C."